(12) United States Patent
Moribe et al.

(10) Patent No.: US 6,362,951 B1
(45) Date of Patent: Mar. 26, 2002

(54) CONTAINER FOR USE IN A COMMUNICATION APPARATUS HAVING A PLURALITY FROM ONE ANOTHER IN WATERPROOF LEVEL OF INDEPENDENT CHAMBERS WHICH ARE DIFFERENT

(75) Inventors: Makoto Moribe, Tokyo; Hironobu Goto, Miyagi; Kazuki Yoshida, Tokyo; Tsuyoshi Imaizumi, Yokohama; Hitoshi Takeda; Kiyotaka Tanaka, both of Tokyo, all of (JP)

(73) Assignees: NEC Corporation, Tokyo; Sumitomo Electric Industries, Ltd., Osaka, both of (JP)

( * ) Notice: Subject to any disclaimer, the term of this patent is extended or adjusted under 35 U.S.C. 154(b) by 0 days.

(21) Appl. No.: 09/450,330

(22) Filed: Nov. 29, 1999

(Under 37 CFR 1.47)

Related U.S. Application Data

(63) Continuation-in-part of application No. 08/977,423, filed on Nov. 24, 1997, now abandoned.

(51) Int. Cl.⁷ ................................................ H02B 1/00
(52) U.S. Cl. ............... 361/600; 174/17.06; 174/17 VA; 174/50.51; 361/679
(58) Field of Search ........................... 174/17 R, 17.05, 174/17.08, 50, 50.5, 50.51, 50.52, 52.3; 361/600, 641, 679, 724, 728, 752, 796, 826–827

(56) References Cited

U.S. PATENT DOCUMENTS

| | | | | | |
|---|---|---|---|---|---|
| 4,133,021 | A | * | 1/1979 | King et al. | 361/724 |
| 4,369,484 | A | * | 1/1983 | Fugate et al. | 361/724 |
| 4,890,318 | A | * | 12/1989 | Crane et al. | 361/641 |
| 5,812,373 | A | * | 9/1998 | Hwang | 361/724 |

* cited by examiner

*Primary Examiner*—Gregory Thompson
(74) *Attorney, Agent, or Firm*—Scully, Scott, Murphy & Presser

(57) ABSTRACT

A container box for use in a communication apparatus. The container box has a container case defining an internal space; partitions connected to the container case for partitioning the internal space to have at least two accommodating chambers; and a container cover corresponding to each of the at least two accommodating chambers. Each cover is connected to the container case for independently closing and opening the at least two accommodating chambers. Wherein the at least two accommodating chambers each have differing degrees of waterproof level.

9 Claims, 2 Drawing Sheets

CONTAINER FOR USE IN A COMMUNICATION APPARATUS HAVING A PLURALITY FROM ONE ANOTHER IN WATERPROOF LEVEL OF INDEPENDENT CHAMBERS WHICH ARE DIFFERENT

CROSS-REFERENCE TO RELATED APPLICATIONS

This application is a continuation-in-part of U.S. application Ser. No. 08/977,423 filed Nov. 24, 1997, now abandoned.

BACKGROUND OF INVENTION

This invention relates to a communication apparatus used in an open-air environment and, in particular, to a container box for use in the communication apparatus.

Typically, communication apparatus are attached to an open-wire or aerial communication cable extended between utility poles in a power network. For the purpose of protection against various influences from an open-air environment, the communication apparatus is accommodated in a container box.

Referring to FIG. 1, a typical conventional container box for a communication apparatus comprises a container case 1 having an open end, a single container cover 2 for closing the open end of the container case 1, and a waterproof packing or stuffing 3 interposed between a marginal surface of the container case 1 at its open end and a confronting surface of the container cover 2 to seal an internal space of the container case 1 in a watertight condition.

In the conventional container box in FIG. 1, a plurality of internal elements are accommodated in the single internal space. These internal elements are different in material, structure, and function and therefore require different waterproof levels. Thus, a whole of the single internal space must be sealed watertight so as to assure a sufficient waterproof level corresponding to a highest one of the different waterproof levels of the internal elements. Practically, it is difficult and uneconomical to assure such a highest waterproof level over the whole of the single internal space.

Referring to FIG. 2, another conventional container box comprises a container case 4 and a partition wall 5 partitioning an internal space of the container case 4 to form an electronic apparatus accommodating chamber 6 and a cable connection accommodating chamber 7. The electronic apparatus accommodating chamber 6 is for accommodating an electronic apparatus while the cable connection accommodating chamber 7 is for accommodating a cable connection. In this case also, an open end of the container case 4 is closed by a single container cover (not shown).

In the conventional container box in FIG. 2, the electronic apparatus accommodating chamber 6 and the cable connection accommodating chamber 7 are isolated from each other by the partition wall 5. Following variation in ambient temperature, a pressure difference is produced between the electronic apparatus accommodating chamber 6 and the external environment or atmosphere. This results in easy condensation of dewdrops in the electronic apparatus accommodating chamber 5. Like the first-mentioned conventional container box, the open end of the container case 4 is closed by the single container cover. Again, it is therefore difficult and uneconomical to assure a sufficient waterproof level as described above.

In both of the conventional container boxes, it is impossible to expose a particular one of the internal elements alone which is to be subjected to some operation such as maintenance work. In other words, all of the internal elements are inevitably exposed because the single container cover must be opened to gain access to the particular internal element. This results in decrease in operability. In addition, the other internal elements requiring no operation may often be deteriorated in reliability because they are exposed to the external environment during operation of the particular internal element.

SUMMARY OF THE INVENTION

It is therefore an object of this invention to provide a container box for use in a communication apparatus, having a plurality of independent chambers which are different from one another in waterproof level.

It is another object of this invention to provide a container box of the type described, which is capable of achieving an improvement in reliability of the communication apparatus because a particular internal element can be operated without affecting other internal elements.

It is still another object of this invention to provide a communication apparatus improved in operability and reliability by the use of a container box of the type mentioned above.

Other objects of this invention will become clear as the description proceeds.

According to a first embodiment of the present invention, there is provided a container box for use in a communication apparatus. The container box comprises: a container case defining an internal space; partitioning means connected to said container case for partitioning said internal space to have at least two accommodating chambers; and a container cover corresponding to each of said at least two accommodating chambers. Each cover is connected to said container case for independently closing and opening said at least two accommodating chambers, wherein said at least two accommodating chambers each have differing degrees of waterproof level.

In a second embodiment of the present invention, a communication apparatus is provided. The communication apparatus comprises an electronic apparatus and a container box accommodating said electronic apparatus. The container box comprises: a container case defining an internal space; partitioning means connected to said container case for partitioning said internal space to have at least two accommodating chambers, one of which accommodates said electronic apparatus; and a container cover corresponding to each of said at least two accommodating chambers, each cover being connected to said container case for independently closing and opening said at least two accommodating chambers, wherein said at least two accommodating chambers each have differing degrees of waterproof level.

In a variation of the first and second embodiments of the present invention, the at least two accommodating chambers comprises first, second, and third accommodating chambers. Furthermore, said partitioning means comprises a first partition wall connected to said container case and placed between said first and said second accommodating chambers and a second partition wall connected to said container case and placed between said second and said third accommodating chambers.

In another variation of the first and second embodiments of the present invention, at least one of said first and second partition walls has a pressure regulating hole for regulating a pressure between adjoining accommodating chambers. The pressure regulating hole is preferably provided with an air-permeable film through which gas is permeable and which liquid is not permeable.

In yet another variation of the container box of the present invention, the first accommodating chamber has waterproofness, the second accommodating chamber has drip-proofness and ventilability, and the third accommodating chamber has water permeability and ventilability.

DESCRIPTION OF PREFERRED EMBODIMENTS

Now, description will be made about preferred embodiments of this invention with reference to the drawings.

Figure 1:
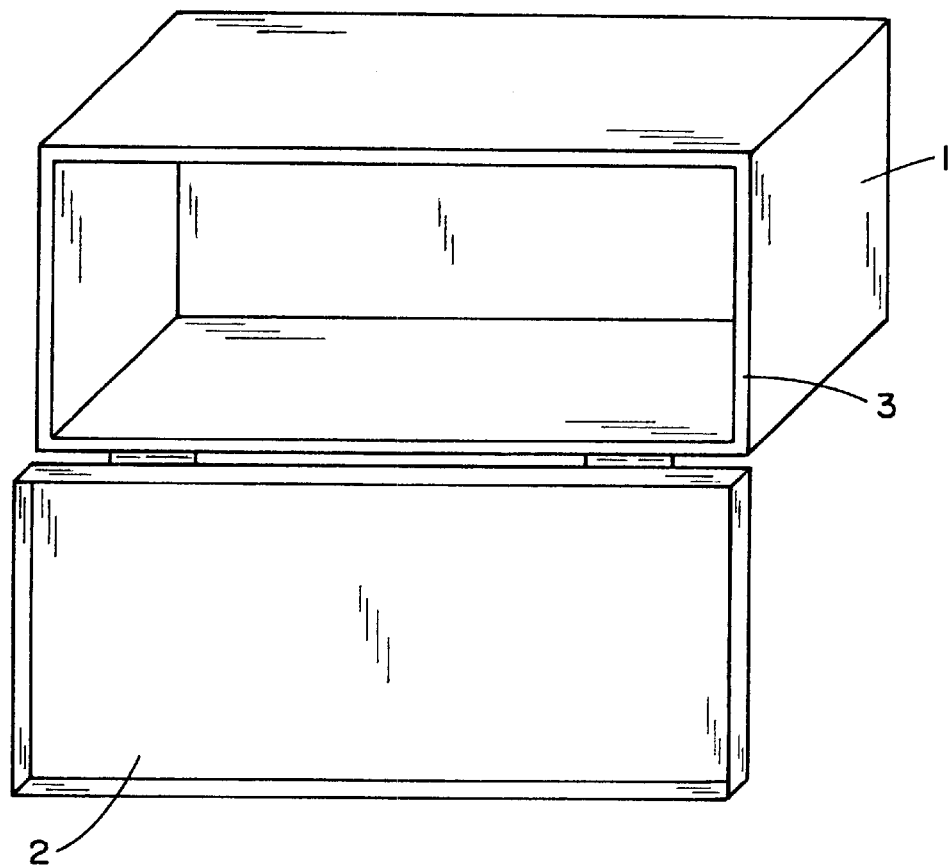
FIG. 1 is a perspective view of a conventional container box for a communication apparatus.
Figure 2:
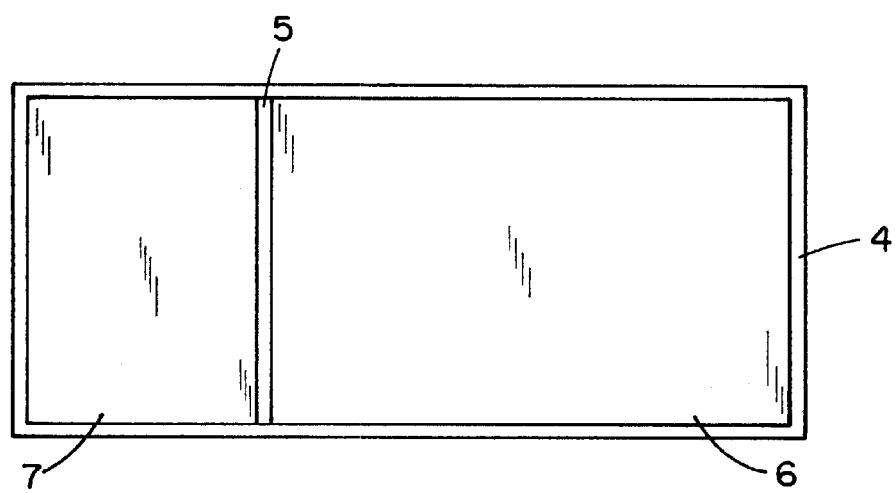
FIG. 2 is a front view of another conventional container box for a communication apparatus.
Figure 3:
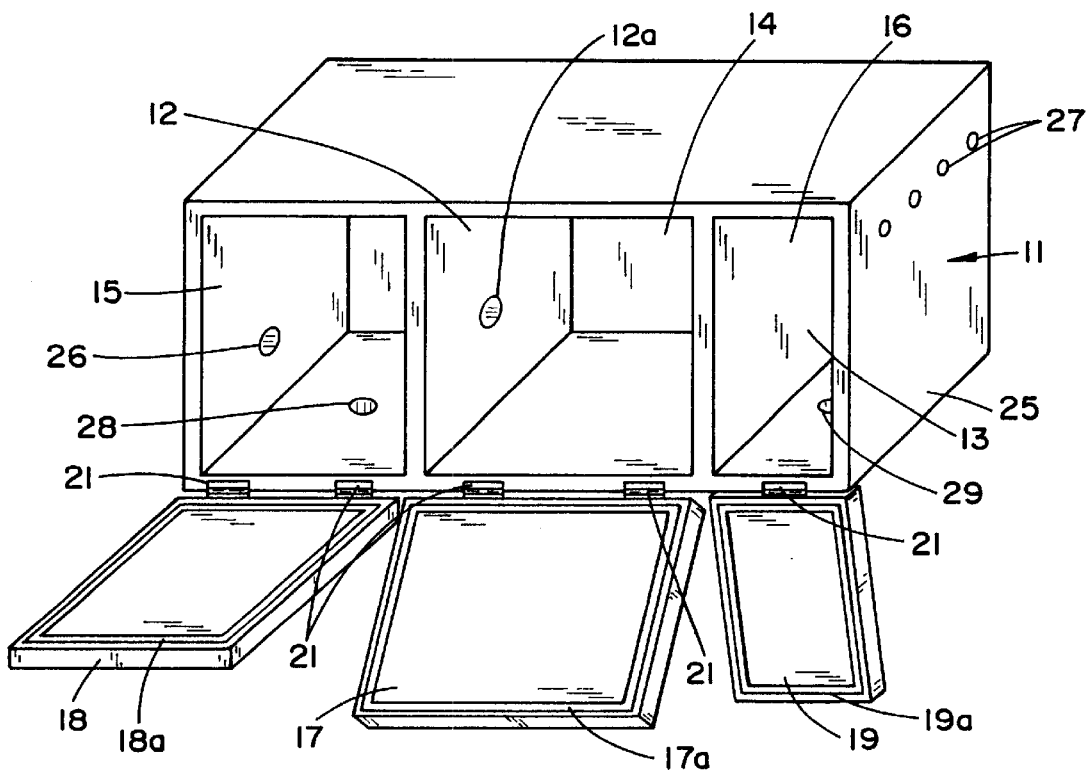
FIG. 3 is a perspective view of a container box for a communication apparatus according to the present invention.

At first referring to FIG. 3, the description will be directed to a container box according to a first embodiment of this invention. The container box is for use in a communication apparatus and comprises a container case 11. The container case 11 has an internal space partitioned by first and second partition walls 12 and 13 to form first, second, and third accommodating chambers 14, 15, and 16 adjacent to one another in a horizontal direction, respectively.

The first accommodating chamber 14 preferably has waterproofness. The second accommodating chamber 15 preferably has drip-proofness and ventilability. The third accommodating chamber 16 preferably has water permeability and ventilability. The waterproofness and the drip-proofness are discussed below with reference to FIG. 3 and also defined by Japanese Industrial Standard JIS-C0920. Thus, the first through the third accommodating chambers 14 through 16 are formed as independent spaces having different waterproof levels. In this event, a combination of the first and the second partition walls 12 and 13 is referred to as a partitioning arrangement.

The container case 11 comprises first through third container covers 17 through 19 corresponding to the first through the third accommodating chambers 14 through 16, respectively. The first through the third container covers 17 through 19 are rotatably attached to the container case 11 by the use of hinges 21 to independently open and close the first through the third accommodating chambers 14 through 16. Each of the first through the third accommodating chambers 14 through 16 has an open end. When each accommodating chamber is closed by each corresponding container cover, a marginal surface of each accommodating chamber at the open end of the container case 11 is brought into tight contact with a confronting surface of each container cover.

Figure 4:
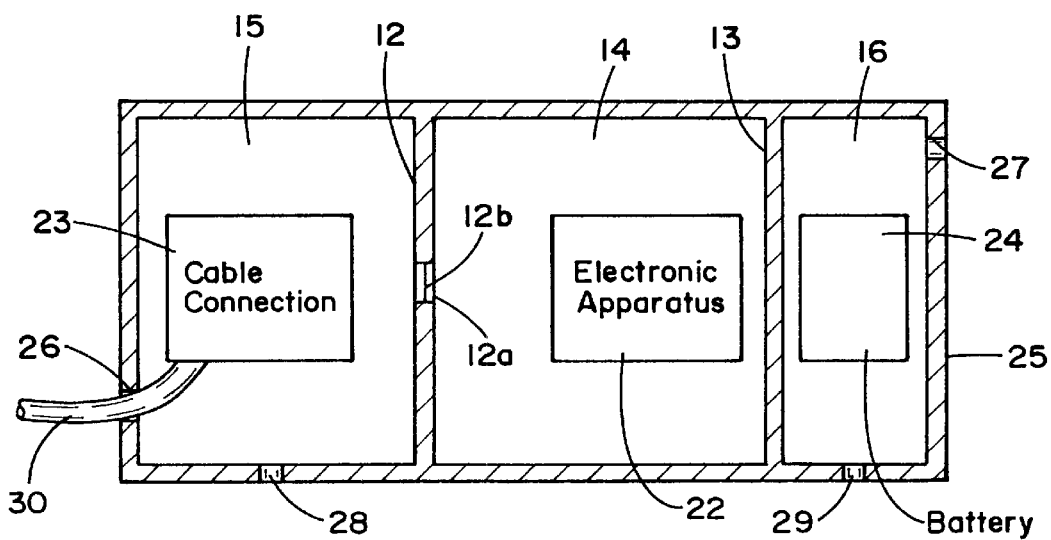
FIG. 4 is a cross-sectional view of the container box for a communication apparatus of FIG. 3.

As illustrated in FIG. 4, the communication apparatus comprises an electronic apparatus 22, a cable connection 23, and a battery 24. The first accommodating chamber 14 serves as an electronic apparatus accommodating chamber for accommodating the electronic apparatus 22. The second accommodating chamber 15 serves as a cable connection accommodating chamber for accommodating the cable connection 23. The third accommodating chamber 16 serves as a battery accommodating chamber for accommodating the battery 24. Throughout the specification, the electronic apparatus 22, the cable connection 23, and the battery 24 may collectively be called internal elements.

In practical use, the electronic apparatus 22, the cable connection 24, and the battery 25 are accommodated in the first through the third accommodating chambers 14 through 16, respectively. The communication apparatus with its internal elements accommodated in the container box is attached to an open-air communication cable extended between utility poles in a power network.

In the above-mentioned communication apparatus, a desired one of the first through the third container covers 17 through 19 can be independently opened to operate a particular one of the internal elements. Thus, operability is improved. In addition, the particular internal element can be operated without affecting the other internal elements. Therefore, a high reliability is maintained after the operation of the particular internal element.

Referring to FIGS. 3 and 4, the container case preferably 11 has a side wall 25 which is formed with a cable introducing hole 26, a plurality of gas escaping holes 27, and two drain holes 28 and 29. As is known in the art, suitable packing can be provided between the container case 11 and each of the first, the second, and the third container covers 17, 18, and 19. Thus, there is achieved a different desired degree of waterproofness in each of the accommodating chambers.

The cable introducing hole 26 is communicated with the second accommodating chamber 15 and is used for introducing a cable 30 into the second accommodating chamber 15. In this preferred structure, it is assumed that a small gap exists around the cable 30 inserted in the cable introducing hole 26. Therefore, water can invade the second accommodating chamber 15 through the small gap. Thus, the second accommodating chamber 15 is lower than the first accommodating chamber 14 in degree of waterproofness. Any water which enters the second accommodating chamber 15 is drained therefrom through the drain hole 28.

As is known in the art, the battery 24 generates gas in the third accommodating chamber 16. Thus, gas escaping holes 27 are provided in the third accommodating chamber 16. The gas escaping holes 27 are opened at all times and serve to vent the gas from the third accommodating chamber 16 to the outside. Inasmuch as the gas escaping holes 27 are opened at all times, water freely invades into the third accommodating chamber 16 through the gas escaping holes 27. This means that the third accommodating chamber 16 is lower than the second accommodating chamber 15 in degree of waterproofness. Any water entering the third accommodating chamber 16 is drained therefrom through the drain hole 29. Thus, the internal elements of the chambers are protected from water invasion by differing degrees of waterproofness according to the sensitivity of the particular internal element to water. In the preferred implementation discussed above, the electronic apparatus 22 receives the highest degree of waterproof protection, followed by the cable connection 23 and the battery 24.

The cable introducing hole 26 may alternatively be formed at the rear face of the container case 11. Similarly, each of the gas escaping holes 27 can be formed at the rear face or the upper face of the container case 11.

Referring again to FIG. 4, the description will be directed to a container box according to a variation of the embodiments of the present invention. The container box of FIG. 4 is also for use in the communication apparatus and comprises similar parts designated by like reference numerals.

In the container box of FIG. 4, a pressure regulating hole 12a is formed in the first partition wall 12 partitioning the first and the second accommodating chambers 14 and 15. The pressure regulating hole 12a serves to alleviate or suppress a pressure difference between the inside and the outside of the container box and to prevent condensation of dewdrops in the first accommodating chamber 14. The pressure regulating hole 12a is preferably provided with an air-permeable film 12b through which gas is permeable and which a liquid is not permeable. Thus, pressure is regulated between the first and second accommodating chambers 14, 15 without permitting entry of water into the first accommodating chamber 14 from the second accommodating chamber 15.

Although the air-permeable film 12b is placed in the pressure regulating hole 12a in the example illustrated, it may alternatively be attached to at least one surface of the first partition wall 12 to close the pressure regulating hole 12a.

While the present invention has thus far been described in conjunction with a few embodiments thereof, it will readily be possible for those skilled in the art to put this invention into practice in various other manners. For example, the internal space may be partitioned into four or more accommodating chambers. The container covers may be attached to the container case in any appropriate manner different from suspension by the hinges. In addition, the container covers may be removable from the container case.

What is claimed is:

1. A container box for use in a communication apparatus, comprising:
    a container case defining an internal space;
    partitioning means connected to said container case for partitioning said internal space to have at least two accommodating chambers;
    a container cover corresponding to each of said at least two accommodating chambers, each cover being connected to said container case for independently closing and opening said at least two accommodating chambers; and
    means for maintaining each of said at least two accommodating chambers at differing degrees of waterproof level.

2. The container box as claimed in claim 1, wherein said at least two accommodating chambers comprises first, second, and third accommodating chambers, and said partitioning means comprises:
    a first partition wall connected to said container case and placed between said first and said second accommodating chambers; and
    a second partition wall connected to said container case and placed between said second and said third accommodating chambers.

3. The container box as claimed in claim 2, wherein at least one of said first and second partition walls has a pressure regulating hole for regulating a pressure between adjoining accommodating chambers.

4. The container box as claimed in claim 3, wherein said pressure regulating hole is provided with an air-permeable film through which gas is permeable and which liquid is not permeable.

5. A communication apparatus comprising:
    an electronic apparatus; and
    a container box accommodating said electronic apparatus, said container box comprising:
    a container case defining an internal space;
    partitioning means connected to said container case for partitioning said internal space to have at least two accommodating chambers, one of which accommodates said electronic apparatus;
    a container cover corresponding to each of said at least two accommodating chambers, each cover being connected to said container case for independently closing and opening said at least two accommodating chambers; and
    means for maintaining each of said at least two accommodating chambers at differing degrees of waterproof level.

6. The communication apparatus as claimed in claim 5, wherein said at least two accommodating chambers comprises first, second, and third accommodating chambers, and said partitioning means comprises:
    a first partition wall connected to said container case and placed between said first and said second accommodating chambers; and
    a second partition wall connected to said container case and placed between said second and said third accommodating chambers.

7. The communication apparatus as claimed in claim 6, wherein at least one of said first and second partition walls has a pressure regulating hole for regulating a pressure between adjoining accommodating chambers.

8. The communication apparatus as claimed in claim 7, wherein said pressure regulating hole is provided with an air-permeable film through which gas is permeable and which liquid is not permeable.

9. The communication apparatus as claimed in claim 6, wherein said electronic apparatus is contained in said second accommodating chamber and wherein said communication apparatus further comprises a cable connection and a battery contained in said first and third accommodating chambers, respectively.

* * * * *